United States Patent
Kataoka

(10) Patent No.: US 10,422,309 B2
(45) Date of Patent: Sep. 24, 2019

(54) ASSEMBLY STRUCTURE FOR PUMP MODULE

(71) Applicant: TOYOTA JIDOSHA KABUSHIKI KAISHA, Toyota-shi (JP)

(72) Inventor: Chiaki Kataoka, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 8 days.

(21) Appl. No.: 15/814,543

(22) Filed: Nov. 16, 2017

(65) Prior Publication Data

US 2018/0156174 A1    Jun. 7, 2018

(30) Foreign Application Priority Data

Dec. 7, 2016 (JP) ................................. 2016-237907

(51) Int. Cl.
| | |
|---|---|
| *F02M 37/10* | (2006.01) |
| *B60K 15/077* | (2006.01) |
| *F02D 33/00* | (2006.01) |
| *F02M 37/00* | (2006.01) |
| *B60K 15/03* | (2006.01) |

(52) U.S. Cl.
CPC ......... *F02M 37/103* (2013.01); *B60K 15/077* (2013.01); *F02D 33/006* (2013.01); *F02M 37/0082* (2013.01); *F02M 37/106* (2013.01); *B60K 15/03177* (2013.01); *B60K 2015/03243* (2013.01); *B60K 2015/03467* (2013.01); *B60K 2015/0777* (2013.01)

(58) Field of Classification Search
CPC ............................ B60K 15/077; F02M 37/103
See application file for complete search history.

(56) References Cited

U.S. PATENT DOCUMENTS

| | | | | |
|---|---|---|---|---|
| 2,500,834 | A | * | 3/1950 | Korte ...................... B64D 37/16 |
| | | | | 222/333 |
| 2003/0102033 | A1 | | 6/2003 | Dasilva et al. |
| 2004/0005227 | A1 | * | 1/2004 | Cremer ................ F02M 37/103 |
| | | | | 417/360 |
| 2007/0116581 | A1 | * | 5/2007 | Hagist .................. B60K 15/077 |
| | | | | 417/360 |

FOREIGN PATENT DOCUMENTS

| | | |
|---|---|---|
| EP | 0 379 631 A1 | 8/1990 |
| JP | 2003-172217 | 6/2003 |
| JP | 2008-174074 A | 7/2008 |
| JP | 5350095 | 11/2013 |

* cited by examiner

*Primary Examiner* — Jessica Cahill
*Assistant Examiner* — Angelisa L. Hicks
(74) *Attorney, Agent, or Firm* — Oblon, McClelland, Maier & Neudtadt, L.L.P.

(57) ABSTRACT

A pump module is disposed on a bottom portion of a fuel tank in the fuel tank. The pump module includes a suck-up unit for sucking up a fuel and a plurality of engaged portions. A bracket includes a base portion, a plurality of engaging portions, and a flow path. The base portion is a frame member fixed to the bottom portion and surrounding the pump module in a state where a lower end portion is in contact with the bottom portion. The engaging portions protrude from the base portion toward an upper side of the fuel tank and are respectively engaged with the engaged portions of the pump module. The flow path is disposed in the base portion and allows an inside of a frame of the base portion and an outside of the frame of the base portion to communicate with each other.

8 Claims, 9 Drawing Sheets

ASSEMBLY STRUCTURE FOR PUMP MODULE

INCORPORATION BY REFERENCE

The disclosure of Japanese Patent Application No. 2016-237907 filed on Dec. 7, 2016 including the specification, drawings and abstract is incorporated herein by reference in its entirety.

BACKGROUND

1. Technical Field

The present disclosure relates to an assembly structure for a pump module.

2. Description of Related Art

Japanese Patent No. 5350095 (JP 5350095 B) discloses a structure in which a bracket is disposed on the bottom portion of the main body of a fuel tank and a pump module is assembled on the upper portion of the bracket via the bracket.

SUMMARY

In the structure disclosed in JP 5350095 B, the position of the pump module becomes higher to the same extent as the thickness (height) of the bracket. As a result, the fuel in the fuel tank cannot be sucked up in a case where the liquid surface of the fuel in the fuel tank is lower than the upper surface of a base portion (surface positioned on the upper side of the tank).

The disclosure provides an assembly structure for a pump module that is capable of sucking up a fuel even in a case where the liquid surface of the fuel in a fuel tank is lower than the upper surface of a base portion (surface positioned on the upper side of the tank).

A first aspect relates to an assembly structure for a pump module. The assembly structure includes a pump module disposed on a bottom portion of a fuel tank in the fuel tank. The pump module includes a suck-up unit and a plurality of engaged portions. The suck-up unit is disposed in a lower end portion of the pump module positioned on a lower side of the fuel tank to suck up a fuel. The plurality of engaged portions are disposed in an outer peripheral portion of the pump module. The pump module further includes a bracket including a base portion, a plurality of engaging portions, and a flow path. The base portion is a frame member fixed to the bottom portion and surrounding the pump module in a state where the lower end portion is in contact with the bottom portion. The engaging portions protrude from the base portion toward an upper side of the fuel tank and are respectively engaged with the engaged portions of the pump module. The flow path is disposed in the base portion and allows an inside of a frame of the base portion and an outside of the frame of the base portion to communicate with each other.

In the assembly structure for a pump module according to the first aspect, the lower end portion of the pump module is in contact with the bottom portion of the fuel tank in a state where the engaged portions of the pump module are respectively engaged with the engaging portions of the bracket. Accordingly, in the assembly structure for the pump module, the suck-up unit is closer to the bottom portion of the fuel tank than in a structure in which the pump module is attached to an upper portion of a bracket. As a result, the fuel flowing into the frame of the base portion from the outside of the frame of the base portion through the flow path can be sucked up even in a case where the liquid surface of the fuel in the fuel tank is lower than an upper surface of the base portion (surface positioned on the upper side of the tank).

In the assembly structure according to the first aspect, the flow path may have a groove portion that is disposed in a lower surface of the base portion positioned on the lower side of the fuel tank and is recessed to the upper side of the fuel tank.

According to the first aspect, the flow path has the groove portion disposed in the lower surface of the base portion and recessed to the upper side of the tank, and thus the fuel is allowed to flow into the frame of the base portion from the outside of the frame of the base portion through the groove portion even in the case where the liquid surface of the fuel in the fuel tank is lower than the upper surface of the base portion (surface positioned on the upper side of the tank).

In the assembly structure according to the first aspect, the base portion as the frame member may have an open part and the flow path may include the open part of the base portion.

According to the first aspect, the flow path includes the open part of the base portion, and thus the fuel is allowed to flow into the frame of the base portion from the outside of the frame of the base portion through the open part even in the case where the liquid surface of the fuel in the fuel tank is lower than the upper surface of the base portion (surface positioned on the upper side of the tank).

In the assembly structure according to the first aspect, the pump module may further include a sub tank and a pump, the sub tank may be disposed on the bottom portion of the fuel tank, the pump may be disposed inside the sub tank, and the pump may be configured to suction the fuel in the sub tank via the suck-up unit.

In the assembly structure according to the first aspect, the sub tank may be a cylinder and the base portion may be a circular frame member.

In the assembly structure according to the first aspect, the base portion may have the engaging portions spaced apart from each other in a circumferential direction of the base portion.

In the assembly structure according to the first aspect, the engaged portions may be grooves disposed in a circumferential wall of the sub tank and the engaging portions of the bracket may have a plate portion and a hook portion, the plate portion may extend from the base portion toward the upper side of the fuel tank, and the hook portion may extend from the plate portion toward the inside of the frame of the base portion and may be inserted into the groove in the sub tank.

A second aspect relates to an assembly structure for a pump module. The assembly structure includes a pump module disposed on a bottom portion of a fuel tank in the fuel tank. The pump module includes a suck-up unit and a plurality of engaged portions. The suck-up unit is disposed in a lower end portion of the pump module positioned on a lower side of the fuel tank to suck up a fuel. The plurality of engaged portions are disposed in an outer peripheral portion of the pump module. The pump module further includes a plurality of brackets including base portions and engaging portions. The plurality of brackets are spaced apart from each other along an outer periphery of the pump module. The base portions are fixed to the bottom portion of the fuel tank and the engaging portions protrude from the base portions toward an upper side of the fuel tank and are engaged with the engaged portions of the pump module in a state where the lower end portion is in contact with the bottom portion.

In the assembly structure for a pump module according to the second aspect, the lower end portion of the pump module is in contact with the bottom portion of the fuel tank in a state where the engaged portions of the pump module are respectively engaged with the engaging portions of the brackets. Accordingly, in the assembly structure for a pump module, the suck-up unit is closer to the bottom portion of the fuel tank than in a structure in which the pump module is attached to an upper portion of a bracket. As a result, the fuel flowing in from the outside of the part surrounded by the brackets through a gap between the adjacent brackets (base portions) can be sucked up even in the case where the liquid surface of the fuel in the fuel tank is lower than the upper surface of the base portion (surface positioned on the upper side of the tank).

According to the aspects, an assembly structure for a pump module can be provided that is capable of sucking up a fuel even in a case where the liquid surface of the fuel in a fuel tank is lower than the upper surface of a base portion (surface positioned on the upper side of the tank).

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an assembly structure for a pump module according to a first embodiment will be described.

Figure 1:
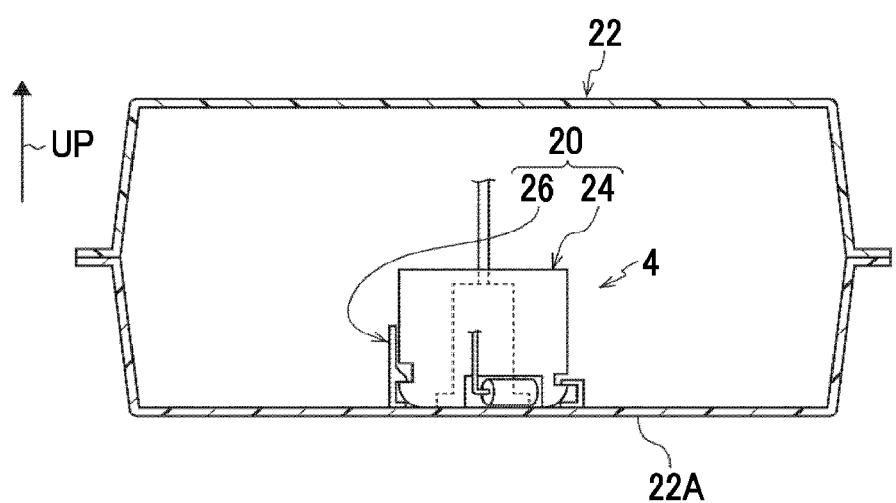
FIG. 1 is a sectional view of a fuel tank to which an assembly structure for a pump module according to a first embodiment is applied.

As illustrated in FIG. 1, an assembly structure 20 for a pump module according to the present embodiment (hereinafter, appropriately referred to as "the assembly structure 20") is a structure that is used for a pump module 24 to be assembled via a bracket 26 on a bottom portion 22A of a fuel tank 22.

In the accompanying drawings, the top of a vehicle and the top of the tank face the same direction in a state where the fuel tank 22 is mounted in the vehicle. The direction is shown by the arrow UP.

The fuel tank 22 to which the assembly structure 20 according to the embodiment is applied will be described first, and then the assembly structure 20 will be described.

The fuel tank 22 has the shape of a box as illustrated in FIG. 1. A fuel can be accommodated in the fuel tank 22. The fuel tank 22 is formed of resin (thermoplastic resin in the embodiment). An opening portion for inlet pipe (not illustrated) connection, an opening portion allowing a delivery pipe 38 (described later) of the pump module 24 to pass through the fuel tank 22, and so on are formed in the fuel tank 22. The opening portions and the like are not illustrated in FIG. 1.

Figure 4:
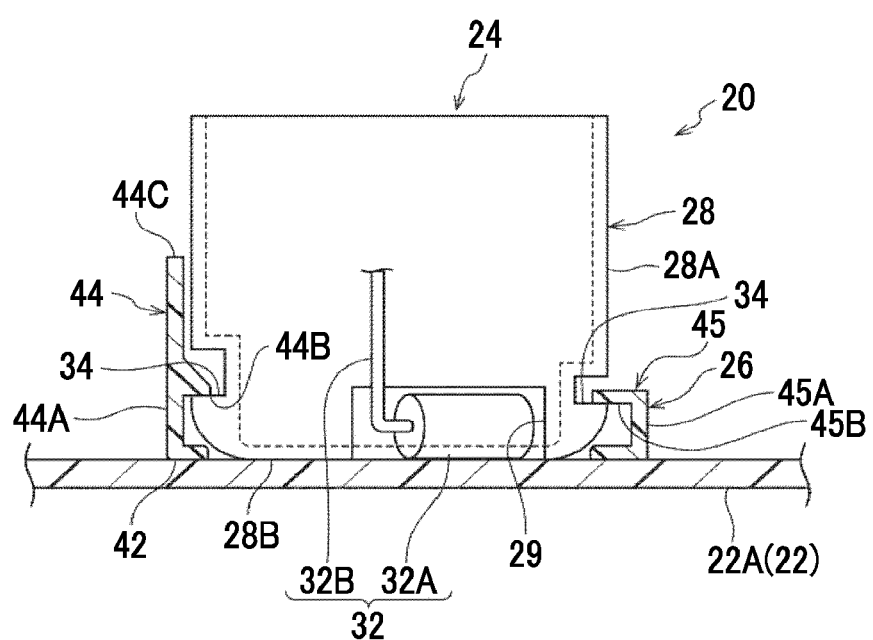
FIG. 4 is an enlarged view of a part indicated by arrow 4 in FIG. 1.

The assembly structure 20 according to the embodiment will be described below. As illustrated in FIGS. 1 and 4, the assembly structure 20 is provided with the pump module 24 and the bracket 26. The pump module 24 is for the fuel in the fuel tank 22 to be supplied to an engine (not illustrated). The bracket 26 is for the pump module 24 to be assembled on the bottom portion 22A of the fuel tank 22.

Pump Module 24

Figure 2:
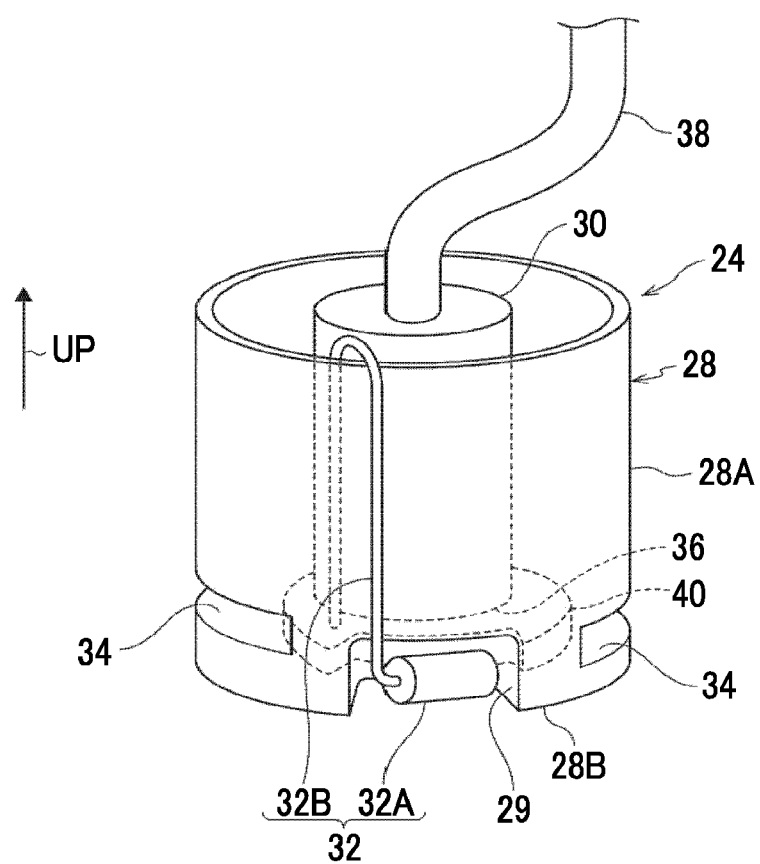
FIG. 2 is a perspective view of the pump module illustrated in FIG. 1.

As illustrated in FIGS. 2 and 4, the pump module 24 is provided with a sub tank 28, a pump 30, a suck-up unit 32 for sucking up the fuel, and a plurality of engaged portions 34. The sub tank 28 is disposed on the bottom portion in the fuel tank 22. The pump 30 is disposed inside the sub tank 28. The suck-up unit 32 is disposed in a lower end portion 28B positioned on the lower side of the tank of the sub tank 28. Hook portions 44B, 45B of a plurality of engaging portions 44, 45 (described later) of the bracket 26 are engaged with the engaged portions 34.

The sub tank 28 has a substantially cylindrical shape with its upper end portion on the upper side of the tank open and the lower end portion 28B on the lower side of the tank blocked.

The pump 30 is disposed inside the sub tank 28. A suction port 36 is disposed in the end portion of the pump 30 that is on the lower side of the tank. The suction port 36 is capable of suctioning the fuel.

A filter 40 is mounted beneath the suction port 36 of the pump 30. The filter 40 is formed in the shape of a bag by a mesh-shaped member being used. The suction port 36 is positioned in the filter 40. The filter 40 is capable of removing foreign matter from the fuel when the fuel in the sub tank 28 is suctioned from the suction port 36.

The suck-up unit 32 is provided with a tubular suck-up port 32A and a hose portion 32B. The suck-up port 32A is accommodated in a recessed accommodating portion 29. The accommodating portion 29 is formed on the lower end portion 28B side of a circumferential wall 28A of the sub tank 28. The hose portion 32B connects the suck-up port 32A and the filter 40 to each other. The suck-up port 32A is connected to the suction port 36 via the hose portion 32B and the filter 40.

In the pump module 24, the fuel around the sub tank 28 is sucked up through the suck-up port 32A by the pump 30 being driven. After the foreign matter is removed by the filter 40, the fuel can be sent to the engine (not illustrated) through the suction port 36 and the delivery pipe 38.

The engaged portions 34 are disposed in the outer periphery of the sub tank 28. In the embodiment, the number of the engaged portions 34 is two. The engaged portions 34 are spaced apart from each other in the circumferential direction of the sub tank 28. The engaged portions 34 are grooves formed in the circumferential wall 28A of the sub tank 28. The grooves extend along the circumferential direction of the sub tank 28. In the embodiment, the engaged portions 34 are the grooves. However, the disclosure is not limited to the above-described configuration. For example, the engaged portions 34 may also be protruding portions protruding from the outer periphery of the sub tank 28 insofar as the hook portion 44B of the engaging portion 44 and the hook portion 45B of the engaging portion 45 (described later) can be engaged (hooked).

Bracket 26

Figure 3:
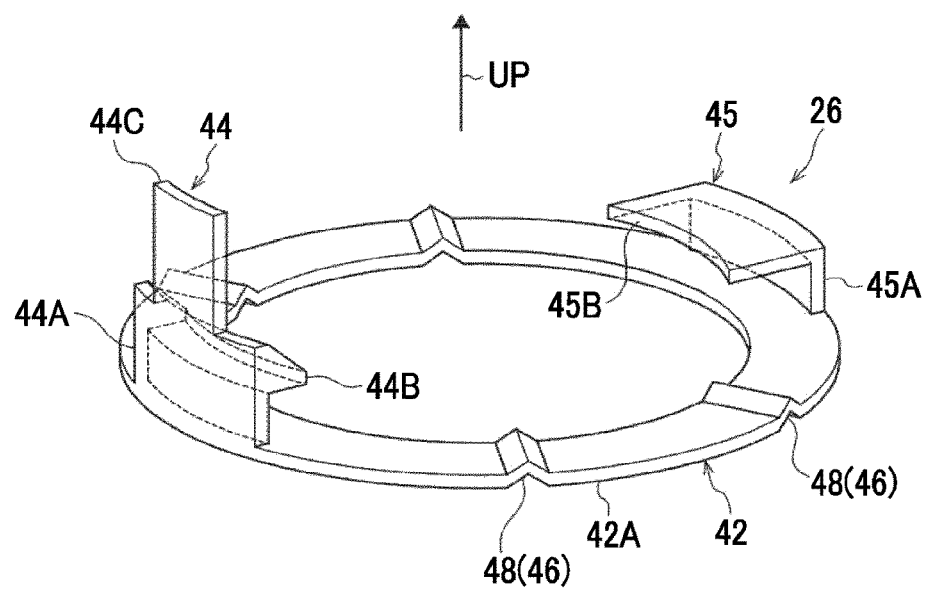
FIG. 3 is a perspective view of a bracket illustrated in FIG. 1.
Figure 5:
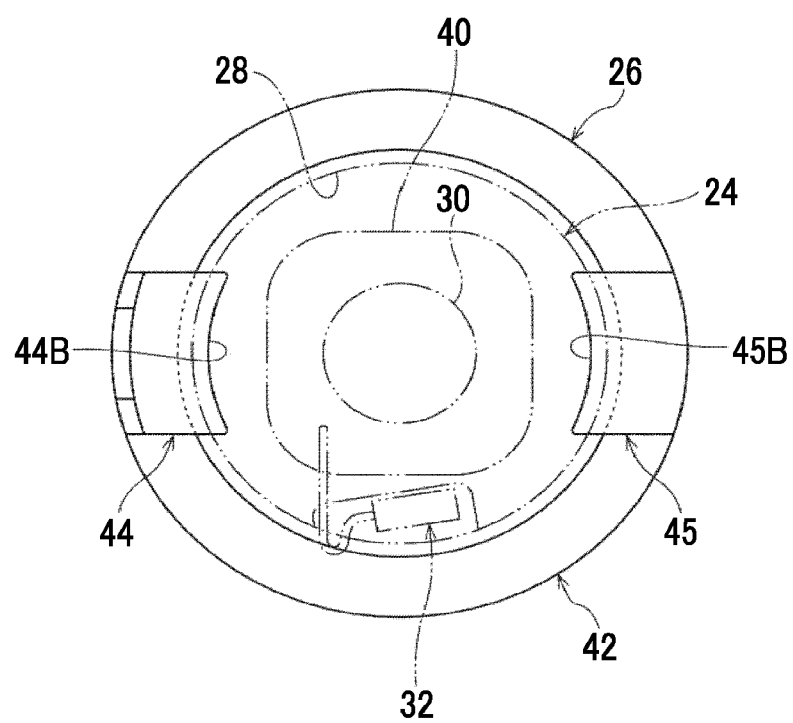
FIG. 5 is a plan view in which the assembly structure for the pump module illustrated in FIG. 4 is seen from above the tank.

As illustrated in FIGS. 3 to 5, the bracket 26 has a frame-shaped base portion 42 and the engaging portions 44, 45. The engaging portions 44, 45 are engaged with the engaged portions 34 disposed in the sub tank 28, respectively.

The base portion 42 is fixed to the bottom portion 22A of the fuel tank 22 and surrounds the lower portion of the sub tank 28 (lower portion of the pump module 24) in a state where the lower end portion 28B is in contact with the bottom portion 22A. In the embodiment, the sub tank 28 has a substantially cylindrical shape, and thus the base portion 42 also has the shape of a substantially circular frame in accordance with the shape of the sub tank 28. In the embodiment, the base portion 42 is fixed to the bottom portion 22A by welding.

The base portion 42 is continuous in the circumferential direction. The engaging portions 44, 45 are spaced apart from each other in the circumferential direction. In the embodiment, the engaging portions 44, 45 are disposed at diametrically opposite positions with respect to the base portion 42.

The engaging portion 44 is provided with a plate portion 44A and the hook portion 44B. The plate portion 44A extends toward the upper side of the tank from the base portion 42. The hook portion 44B extends toward the inside of the frame of the base portion 42 from an intermediate portion of the plate portion 44A in the up-down direction of the tank. In a state where the pump module 24 is disposed on the bottom portion 22A, the hook portion 44B is inserted into the engaged portion 34 and engaged with the engaged portion 34. A part 44C of the plate portion 44A that is closer to the upper side of the tank than the hook portion 44B can be used as a lever when the hook portion 44B of the engaging portion 44 is removed from the engaged portion 34.

The engaging portion 45 is provided with a plate portion 45A and the hook portion 45B. The plate portion 45A extends toward the upper side of the tank from the base portion 42. The hook portion 45B extends toward the inside of the frame of the base portion 42 from the end portion of the plate portion 45A that is on the upper side of the tank. In the state where the pump module 24 is disposed on the bottom portion 22A, the hook portion 45B is inserted into the engaged portion 34 and engaged with the engaged portion 34.

As illustrated in FIG. 3, the bracket 26 is an integrally molded resinous article. In view of the welding of the base portion 42 to the bottom portion 22A, it is preferable that the resin that constitutes the bracket 26 has a relatively high level of compatibility with (is of the same type, in particular, as) the resin that constitutes the fuel tank 22.

The bracket 26 is provided with a flow path 46 disposed in the base portion 42 of the bracket 26. The flow path 46 connects the inside of the frame of the base portion 42 and the outside of the frame of the base portion 42 to each other.

The flow path 46 is disposed in a lower surface 42A of the base portion 42 positioned on the lower side of the tank. The flow path 46 includes a plurality of groove portions 48 recessed to the upper side of the tank. The groove portions 48 are spaced apart from each other in the circumferential direction of the base portion 42. The groove portion 48 according to the embodiment is formed by a part of the base portion 42 being pushed up to the upper side of the tank.

Hereinafter, the action and effect of the assembly structure 20 according to the embodiment will be described. In the assembly structure 20, the lower end portion 28B of the sub tank 28 is in contact with the bottom portion 22A of the fuel tank 22 as illustrated in FIG. 4 in a state where the engaging portions 44, 45 of the bracket 26 are respectively engaged with the engaged portions 34 of the pump module 24. Accordingly, in the assembly structure 20, the position of the suck-up port 32A of the suck-up unit 32 is closer to the bottom portion 22A of the fuel tank 22 than in a structure in which the pump module 24 is attached to an upper portion of a bracket. As a result, the fuel flowing into the frame of the base portion 42 from the outside of the frame of the base portion 42 through the flow path 46 (groove portion 48) can be sucked up by the suck-up unit 32 even in a case where the liquid surface of the fuel in the fuel tank 22 is lower than an upper surface 42B of the base portion 42 (surface positioned on the upper side of the tank).

The flow path 46 has the groove portion 48 disposed in the lower surface 42A of the base portion 42 and recessed to the upper side of the tank, and thus the fuel is allowed to flow into the frame of the base portion 42 from the outside of the frame of the base portion 42 through the groove portion 48 even in the case where the liquid surface of the fuel in the fuel tank 22 is lower than the upper surface 42B of the base portion 42 (surface positioned on the upper side of the tank).

The welding of the base portion 42 to the bottom portion 22A of the fuel tank 22 is performed by the base portion 42 being disposed on the bottom portion 22A of the fuel tank 22 in a molten state. The base portion 42 of the bracket 26 according to the embodiment has the shape of a frame (is shaped such that it has an opening in the middle of itself). Accordingly, cooling wind reaches the inside of the frame of the base portion 42, unlike in a base portion that has the shape of a flat plate (is shaped such that it has no opening in the middle of itself), in a forced cooling (blow cooling) process for the bottom portion 22A after the base portion 42 is disposed on the bottom portion 22A. Accordingly, the cooling can be expedited. As a result, manufacturing of the fuel tank 22 can be expedited.

Figure 6:
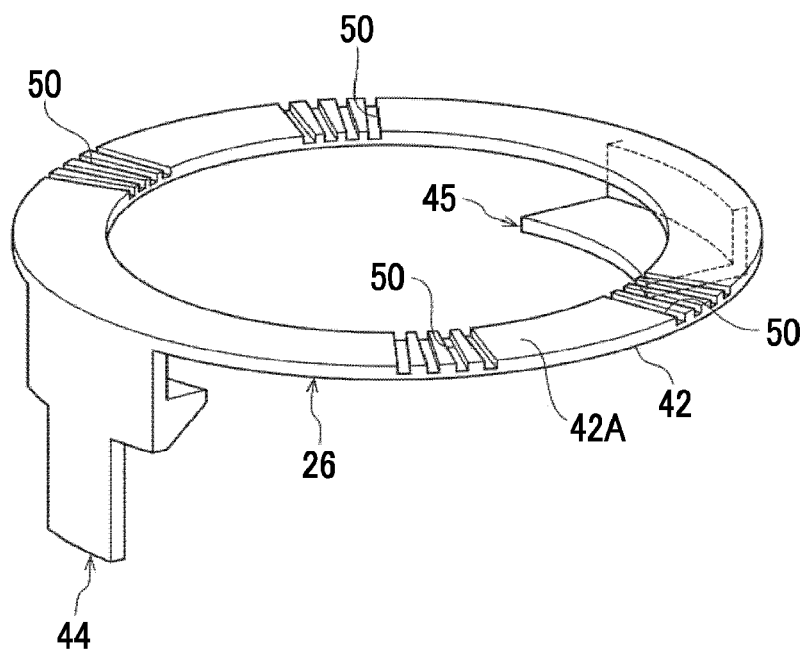
FIG. 6 is a perspective view in which a bracket according to a first modification example is seen from a back surface side.

The first embodiment adopts a configuration in which the groove portions 48 are disposed in the lower surface 42A of the base portion 42. However, the disclosure is not limited thereto. For example, a plurality of (multiple) slits 50 may also be spaced apart from each other (one another) in the circumferential direction in the lower surface 42A of the base portion 42 as illustrated in FIG. 6. The above-described configuration may be applied to a second embodiment as well.

Figure 7:
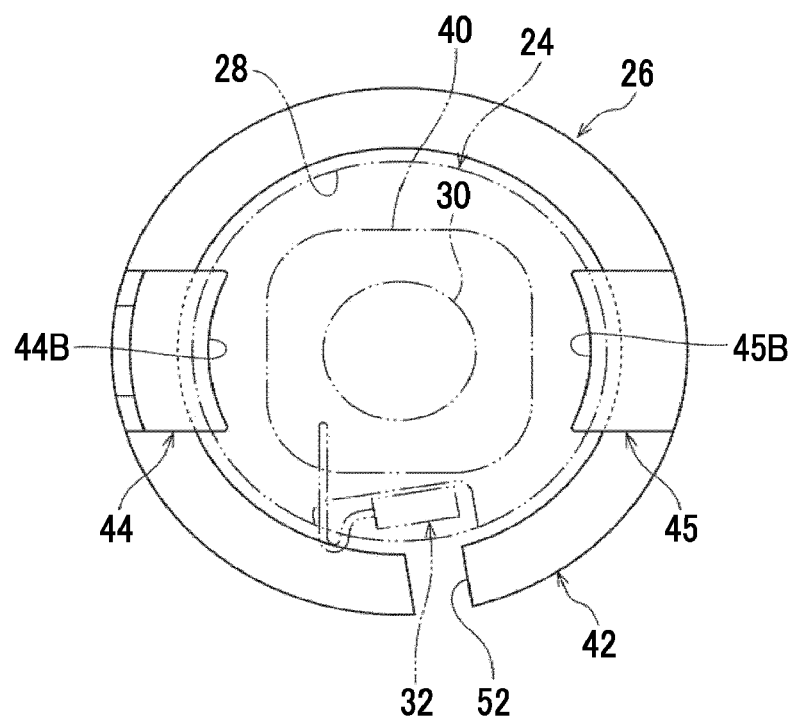
FIG. 7 is a top view in which a bracket according to a second modification example is seen from above the tank.

The first embodiment adopts a configuration in which the base portion 42 of the bracket 26 is continuous in the circumferential direction. However, the disclosure is not limited thereto. For example, the base portion 42 may be shaped such that it is partially open and the open part 52 (hereinafter, appropriately referred to as an "open portion 52") may be a part of the flow path 46 as illustrated in FIG. 7. The base portion 42 of the bracket 26 may also be configured such that merely the open portion 52 is disposed and the groove portion 48 is not disposed in the base portion 42 of the bracket 26.

Figure 8A:
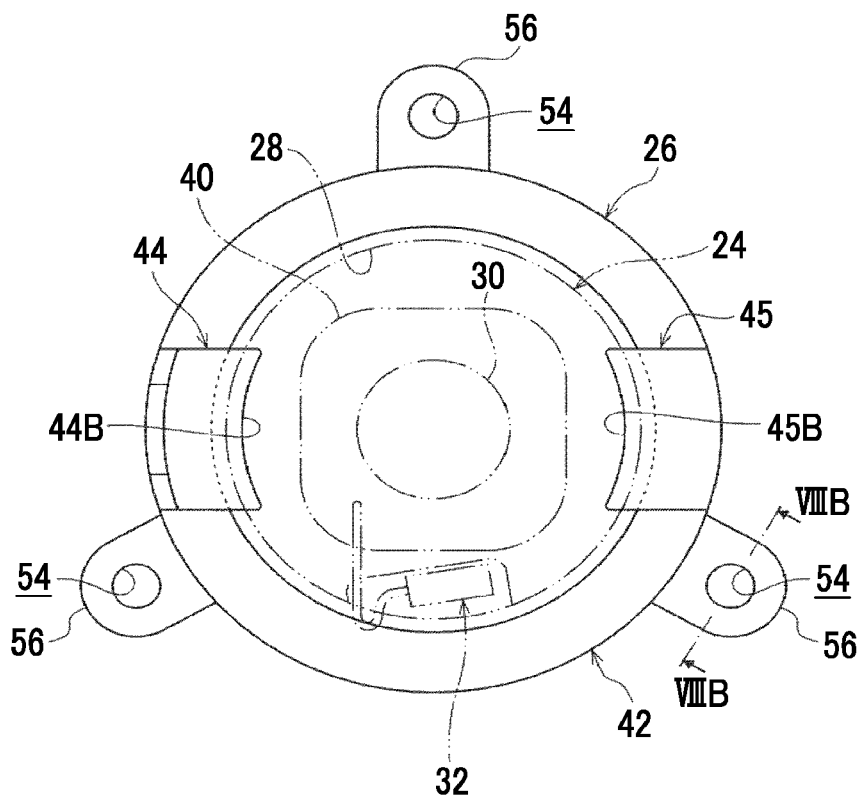
FIG. 8A is a top view in which a bracket according to a third modification example is seen from above the tank.
Figure 8B:
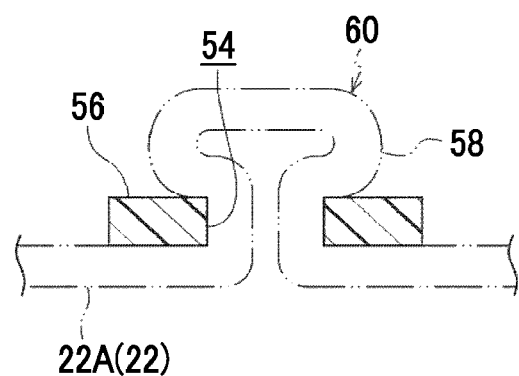
FIG. 8B is a cross-sectional view taken along line VIIIB-VIIIB of FIG. 8A.

The first embodiment adopts a configuration in which the base portion 42 is fixed to the bottom portion 22A of the fuel tank 22 by welding. However, the disclosure is not limited thereto. In an alternative configuration, a protruding portion 56 in which a through-hole 54 is formed may be disposed on the base portion 42 and the fixing may be performed with the through-hole 54 and a caulking portion 60 protruding from the bottom portion 22A and having a flange portion 58 protruding toward the outer periphery side in its tip portion as illustrated in FIG. 8A. The above-described configuration may be applied to the second embodiment as well.

An assembly structure 62 for a pump module according to the second embodiment will be described below. The assembly structure 62 according to the second embodiment is similar to the assembly structure 20 according to the first embodiment except for the configuration of brackets 64. Accordingly, the configuration of the brackets 64 will be described below.

The brackets 64 that are used in the assembly structure 62 according to the embodiment are provided with a plurality of base portions 66 and engaging portions 68. The base portions 66 are obtained by the base portion 42 of the bracket 26 according to the first embodiment being divided in the circumferential direction. The engaging portions 68 protrude from the base portions 66. The engaging portions 68 have the same configuration as the engaging portion 44 according to the first embodiment.

Figure 9:
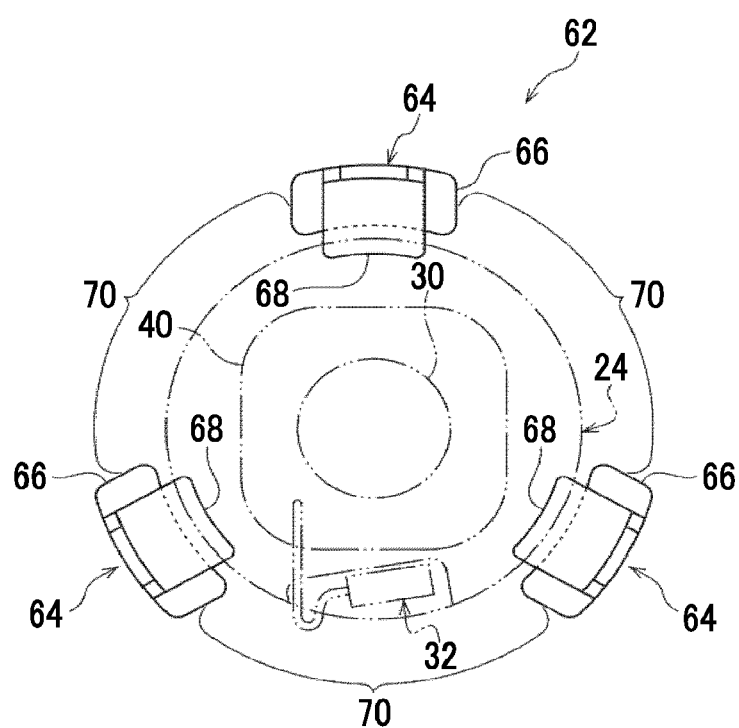
FIG. 9 is a plan view in which an assembly structure for a pump module according to a second embodiment is seen from above the tank.

In the assembly structure 62, the brackets 64 are disposed such that gaps are formed between the adjacent brackets 64 and the pump module 24 is surrounded as illustrated in FIG. 9. In other words, the brackets 64 are spaced apart from each other along the outer periphery of the pump module 24. Accordingly, gaps 70 are formed between the adjacent brackets 64.

Hereinafter, the action and effect of the assembly structure 62 according to the embodiment will be described. In the assembly structure 62, the lower end portion (lower end portion of the sub tank 28) 28B of the pump module 24 is in contact with the bottom portion 22A of the fuel tank 22 in a state where the engaging portions 68 of the brackets 64 are respectively engaged with the engaged portions 34 of the pump module 24 (sub tank 28). Accordingly, in the assembly structure 62, the position of the suck-up unit 32 is closer to the bottom portion 22A of the fuel tank 22 than in a structure in which the pump module 24 is attached to an upper portion of the bracket 64. As a result, the fuel flowing into the frame from the outside of the part surrounded by the base portions 66 through the gap 70 between the adjacent base portions 66 can be sucked up even in the case where the liquid surface of the fuel in the fuel tank 22 is lower than the upper surface 42B of the base portion 42 (surface positioned on the upper side of the tank).

In the assembly structure 62, the gap 70 is formed between the adjacent brackets 64, and thus resin cooling can be expedited in the forced cooling process during tank molding. In other words, cooling wind reaches the gap 70, and thus resin cooling can be further expedited. As a result, manufacturing of the fuel tank 22 can be further expedited.

The present disclosure is not limited to the embodiments described above. It is a matter of course that the embodiment can take different modified forms without departing from the scope of the disclosure.

What is claimed is:

1. An assembly structure for a pump module, the assembly structure comprising:
   a pump module disposed on and abutting a bottom portion of a fuel tank in the fuel tank, the pump module including a suck-up unit and a plurality of engaged portions, the suck-up unit being disposed in a lower end portion of the pump module positioned on a lower side of the fuel tank to suck up a fuel, and the plurality of engaged portions being disposed in an outer peripheral portion of the pump module; and
   a bracket including a base portion, a plurality of engaging portions, and a flow path, wherein:
   the base portion is a frame member fixed to the bottom portion and surrounding the pump module in a state where the lower end portion is in contact with the bottom portion;
   the engaging portions protrude from the base portion toward an upper side of the fuel tank and are respectively engaged with the engaged portions of the pump module;
   the flow path is disposed in the base portion and allows an inside of a frame of the base portion and an outside of the frame of the base portion to communicate with each other;
   the flow path has a groove portion that is disposed in a lower surface of the base portion positioned on the lower side of the fuel tank and is recessed to the upper side of the fuel tank; and
   a surface area of the base portion facing the bottom portion is greater than a projected surface area of the groove portion.

2. The assembly structure according to claim 1, wherein:
   the base portion as the frame member has an open part; and
   the flow path includes the open part of the base portion.

3. The assembly structure according to claim 1, wherein the pump module further includes a sub tank and a pump, the sub tank is disposed on the bottom portion of the fuel tank, the pump is disposed inside the sub tank, and the pump is configured to suction the fuel in the sub tank via the suck-up unit.

4. The assembly structure according to claim 3, wherein:
   the sub tank is a cylinder; and
   the base portion is a circular frame member.

5. The assembly structure according to claim 4, wherein the base portion has the engaging portions spaced apart from each other in a circumferential direction of the base portion.

6. The assembly structure according to claim 3, wherein:
   the engaged portions are grooves disposed in a circumferential wall of the sub tank; and
   the engaging portions of the bracket have a plate portion and a hook portion, the plate portion extends from the base portion toward the upper side of the fuel tank, and the hook portion extends from the plate portion toward the inside of the frame of the base portion and is inserted into the groove in the sub tank.

7. The assembly structure according to claim 6, wherein a part of the plate portion of one of the engaging portions is closer to the upper side of the fuel tank than the hook portion.

8. An assembly structure for a pump module, the assembly structure comprising:
   a pump module disposed on and abutting a bottom portion of a fuel tank in the fuel tank, the pump module including a suck-up unit disposed in a lower end portion of the pump module positioned on a lower side of the fuel tank to suck up a fuel and a plurality of engaged portions disposed in an outer peripheral portion of the pump module; and a plurality of brackets including base portions and engaging portions, and the plurality of brackets are spaced apart from each other along an outer periphery of the pump module, the base portions being fixed to the bottom portion of the fuel tank and the engaging portions protruding from the base portions toward an upper side of the fuel tank and being engaged with the engaged portions of the pump module in a state where the lower end portion is in contact with the bottom portion, wherein one bracket of the plurality of brackets includes a flow path disposed in the base portion of the one bracket of the plurality of brackets and allows an inside of a frame of the base portion of the one bracket of the plurality of brackets and an outside of the frame of the base portion of the one bracket of the plurality of brackets to communicate with each other, wherein the flow path has a groove portion that is disposed in a lower surface of the base portion of the one bracket of the plurality of brackets positioned on the lower side of the fuel tank and is recessed to the upper side of the fuel tank, and wherein a surface area of the base portion facing the bottom portion is greater than a projected surface area of the groove portion.

* * * * *